(12) United States Patent
Huo et al.

(10) Patent No.: US 9,798,102 B2
(45) Date of Patent: Oct. 24, 2017

(54) BARREL HAVING SHRINKING THREADS

(71) Applicant: GeniuS Electronic Optical C., Ltd., Taichung (TW)

(72) Inventors: Andy Huo, Xiamen (CN); Xiaohua Chen, Xiamen (CN); Weian Luo, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 14/879,084

(22) Filed: Oct. 8, 2015

(65) Prior Publication Data

US 2017/0010435 A1 Jan. 12, 2017

(30) Foreign Application Priority Data

Jul. 10, 2015 (CN) .......................... 2015 1 0402335

(51) Int. Cl.
*G02B 7/02* (2006.01)
(52) U.S. Cl.
CPC .................................. *G02B 7/022* (2013.01)
(58) Field of Classification Search
CPC .................................. G02B 7/022; G02B 7/04
USPC .................................................. 359/811–830
See application file for complete search history.

(56) References Cited

U.S. PATENT DOCUMENTS

| 7,565,078 B2 | 7/2009 | Liu | |
|---|---|---|---|
| 2004/0037668 A1* | 2/2004 | Koenig | F16B 39/30 411/423 |
| 2007/0230949 A1* | 10/2007 | Liu | G02B 7/022 396/534 |
| 2013/0182342 A1* | 7/2013 | Chang | G02B 7/021 359/829 |

* cited by examiner

*Primary Examiner* — Stephone B Allen
*Assistant Examiner* — Rahman Abdur
(74) *Attorney, Agent, or Firm* — Baker & McKenzie LLP (57) ABSTRACT

A barrel comprises a cylinder wall, two parting lines, and an external thread. The external thread is intersected by the two parting lines respectively, and the external thread includes a plurality of threads. The plurality of threads are connected spirally and each of the threads includes a pair of normal thread portion and a pair of shrinking thread portion. Each of the normal thread portions includes a normal thread crest and a normal thread root. The plurality of shrinking thread portions are intersected by the parting lines respectively, and each of the shrinking thread portions includes a middle location intersected by one of the parting lines, a shrinking thread crest, and a shrinking thread root. The outer diameter of each of the shrinking thread crests reaches a minimum at the middle location, and the minimal width of the shrinking thread crest is smaller than the normal crest outer diameter. The width of each of the shrinking thread crests is larger than the normal crest width. The width of each of the shrinking thread roots is smaller than the normal root width.

8 Claims, 7 Drawing Sheets

BARREL HAVING SHRINKING THREADS

RELATED APPLICATIONS

This application claims priority from P.R.C. Patent Application No. 201510402335.0 filed on Jul. 10, 2015, the contents of which are hereby incorporated by reference in their entirety for all purposes.

TECHNICAL FIELD

The present disclosure relates to a barrel, and particularly, relates to a barrel which may improve assembly pollution.

BACKGROUND

Generally, an injection molded barrel can produce burrs at its parting line. Therefore, when the barrel engages with a corresponding base, the burrs fall from the parting line because the burrs rub against internal threads of the base, and then the burrs pollute optical elements in an interior of the base and create dust pollution.

Figure 1:
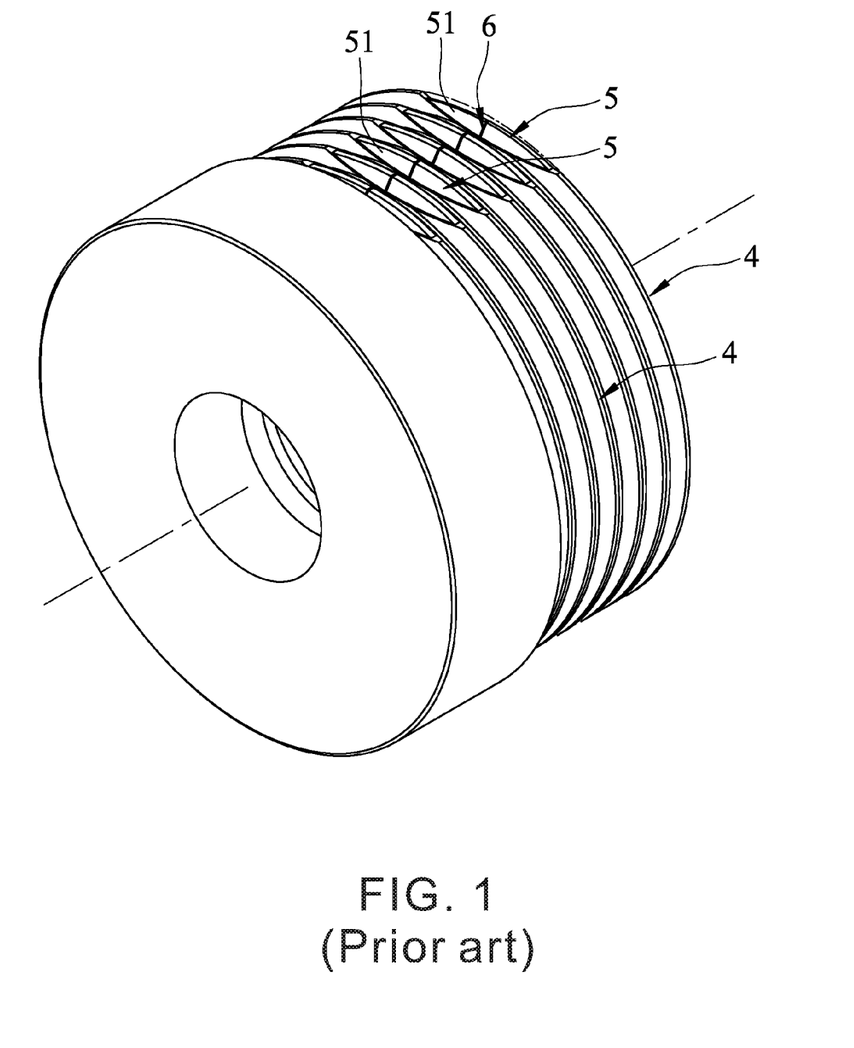
FIG. 1 is a perspective view of a prior barrel.
Figure 2:
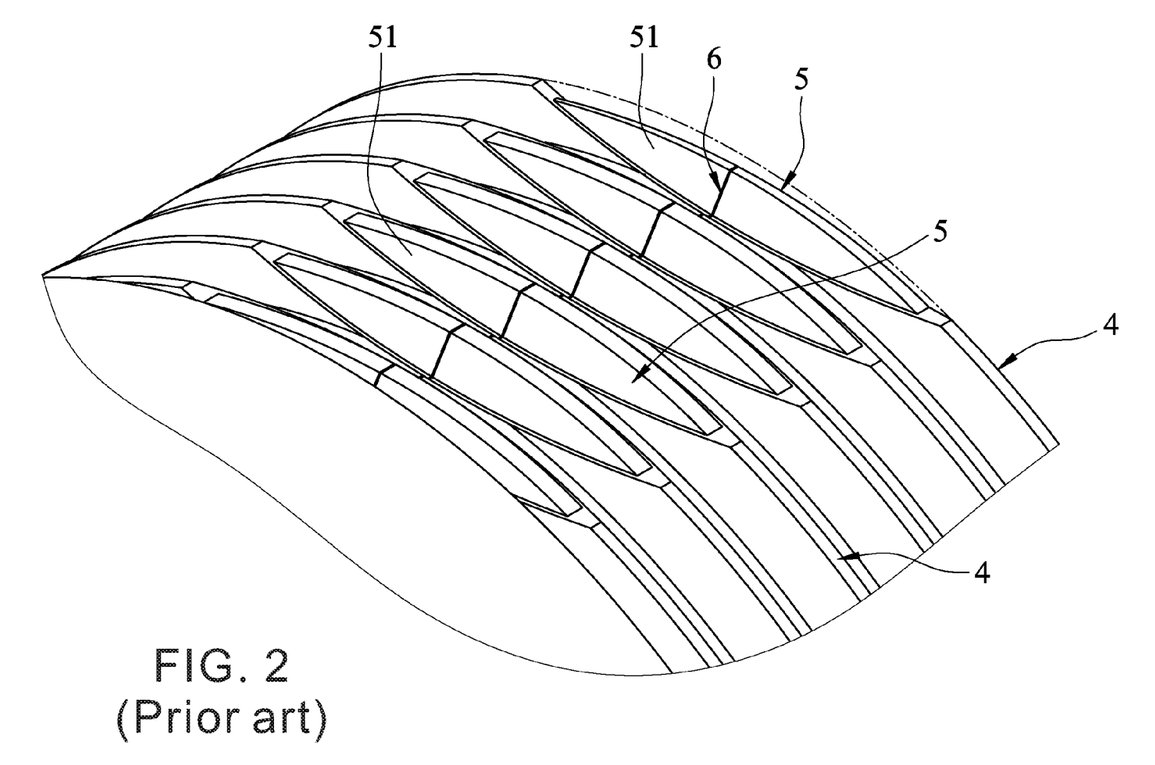
FIG. 2 depicts a plurality of shrinking threads and is an enlarged sectional view of FIG. 1.

Referring to FIG. 1 and FIG. 2, in response to the problems described above, a patent publication "Thread structure for an optical lens" (U.S. Pat. No. 7,565,078) disclosed another thread structure for a barrel, and the thread structure includes a plurality of normal threads 4 and a plurality of shrinking threads 5 recessed in the normal threads 4 near a parting line 6. An outer diameter of each of the normal threads 4 is larger than an outer diameter of a corresponding shrinking thread 5. A width of each of the normal threads 4 along a radial direction is larger than a width of a corresponding shrinking thread 5 along the radial direction. Because the width of the shrinking thread 5 is smaller than the width of the normal threads 4, the burrs at the parting line 6 are retracted from the normal thread 4. When the barrel is engaged with a corresponding base, the burrs located at the parting line 6 can't fall from the parting line 6 because the burrs do not rub against internal threads of the base, and then the dust pollution can be improved. However, a part of the burrs fallen from the parting line 6 can be accumulated in a difference space 51 easily because the plurality of shrinking threads 5 are recessed in the normal threads 4 and coordinated with the normal threads 4 to define the difference space 51. As a result, the burrs and dust accumulated in the difference space 51 easily can fall from the difference space 51 to create dust pollution during the repeated assembly process of the barrel. Moreover, the plurality of shrinking threads 5 can damage a part of the plurality of normal threads 4 to lower the yield of manufacturing the barrel during the parting mold process of the barrel.

SUMMARY

Embodiments of the present disclosure may advantageously provide an improved barrel having a plurality of shrinking threads, and the barrel may improve assembly pollution and increase the yield of manufacturing the barrel.

The barrel of the present disclosure may comprise a cylinder wall, two parting lines, and an external thread. The cylinder wall may extend along an axis direction. The parting lines may be symmetrically distributed along the axis direction. The external thread may be intersected by the two parting lines respectively, and the external thread may include a plurality of threads. The plurality of threads may extend outward from the outer surface of the cylinder wall, and the plurality of threads may be connected spirally and each of the threads may include a pair of normal thread portion and a pair of shrinking thread portion. The pair of the normal thread portions may be located apart at two sides of the parting lines respectively, and each of the normal thread portions may include a normal thread crest, a normal thread root, and two end portions mounted at two opposite sides of the normal thread portion and extended along the axis direction. Each normal thread crest may have a normal crest width along the axis direction. Each normal thread root may have a normal root width along the axis direction. The plurality of shrinking thread portions may be mounted apart and intersected by the parting lines respectively, and each shrinking thread portion may be located between two corresponding normal thread portions and connected with the end portions of the normal thread portions. Each shrinking thread portion may include a middle location intersected by a parting line, a shrinking thread crest, and a shrinking thread root. The outer diameter of each shrinking thread root may decrease from end portions to the middle location along a radial direction, and the outer diameter of each shrinking thread root may reach a minimum at the middle location. The width of each shrinking thread crest may increase from the end portions to the middle location along the axis direction, and the width of each shrinking thread crest may be larger than the normal crest width. The width of each shrinking thread root may decrease from the end portions to the middle location along the axis direction, and the width of each shrinking thread root may be smaller than the normal root width.

With the width of each shrinking thread crest may be larger than the normal crest width at the middle location along the axis direction and the outer diameter of each shrinking thread crest being smaller than the outer diameter of each normal thread portion and the width of each shrinking thread root being smaller than the width of each normal thread portion, the outer counter of the external thread can be continuous and there is no difference space at the outer counter of the external thread. The difference between the outer counters of shrinking thread portion and normal thread portion may decrease so that assembly pollution can be efficiently improved and the yield of manufacturing the barrel can be promoted.

BRIEF DESCRIPTION OF THE DRAWINGS

Exemplary embodiments will be more readily understood from the following detailed description when read in conjunction with the appended drawing, in which.

DETAILED DESCRIPTION

Figure 3:
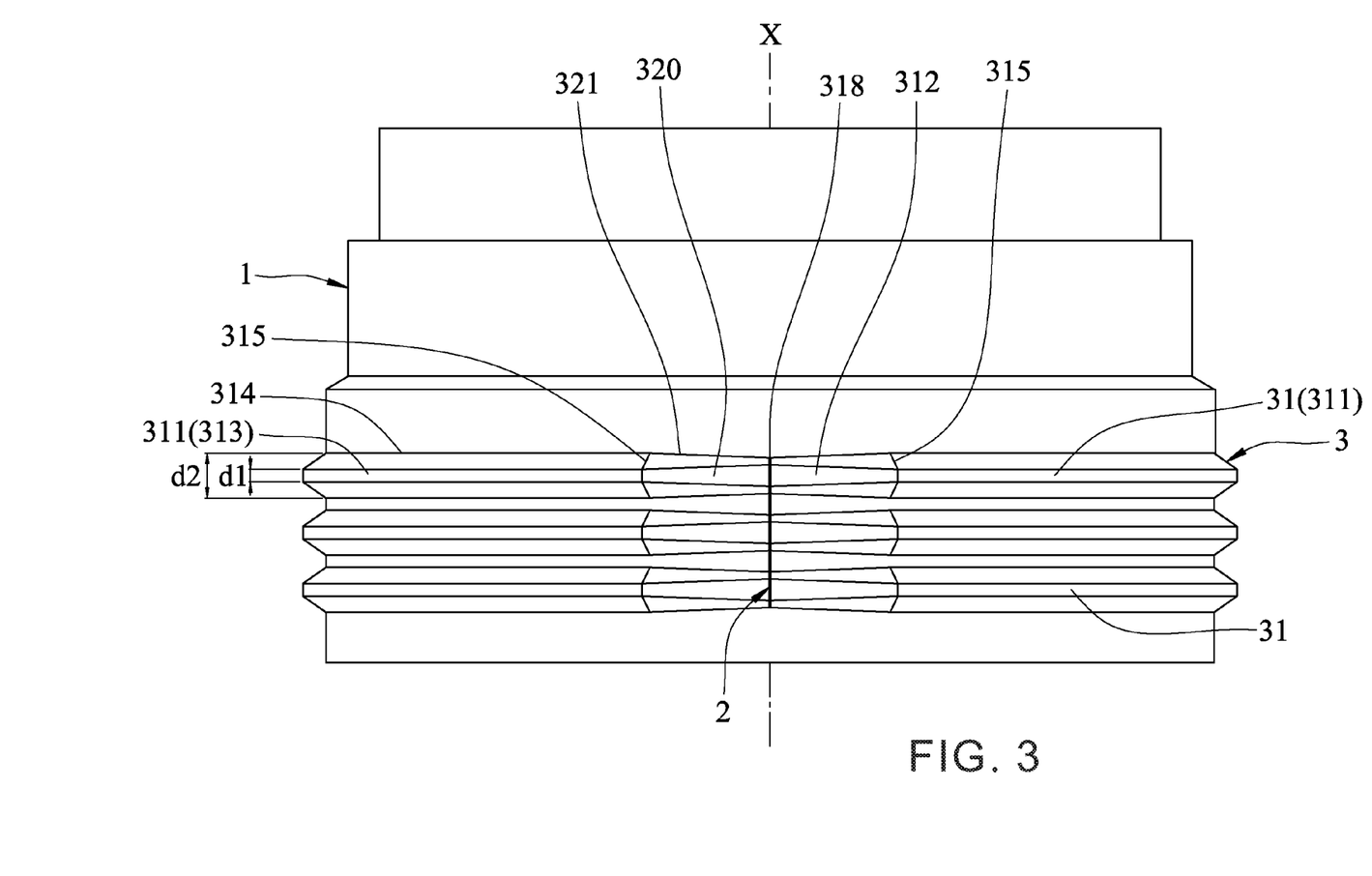
FIG. 3 is a schematic view of an embodiment of a barrel having shrinking threads according to the present disclosure.
Figure 6:
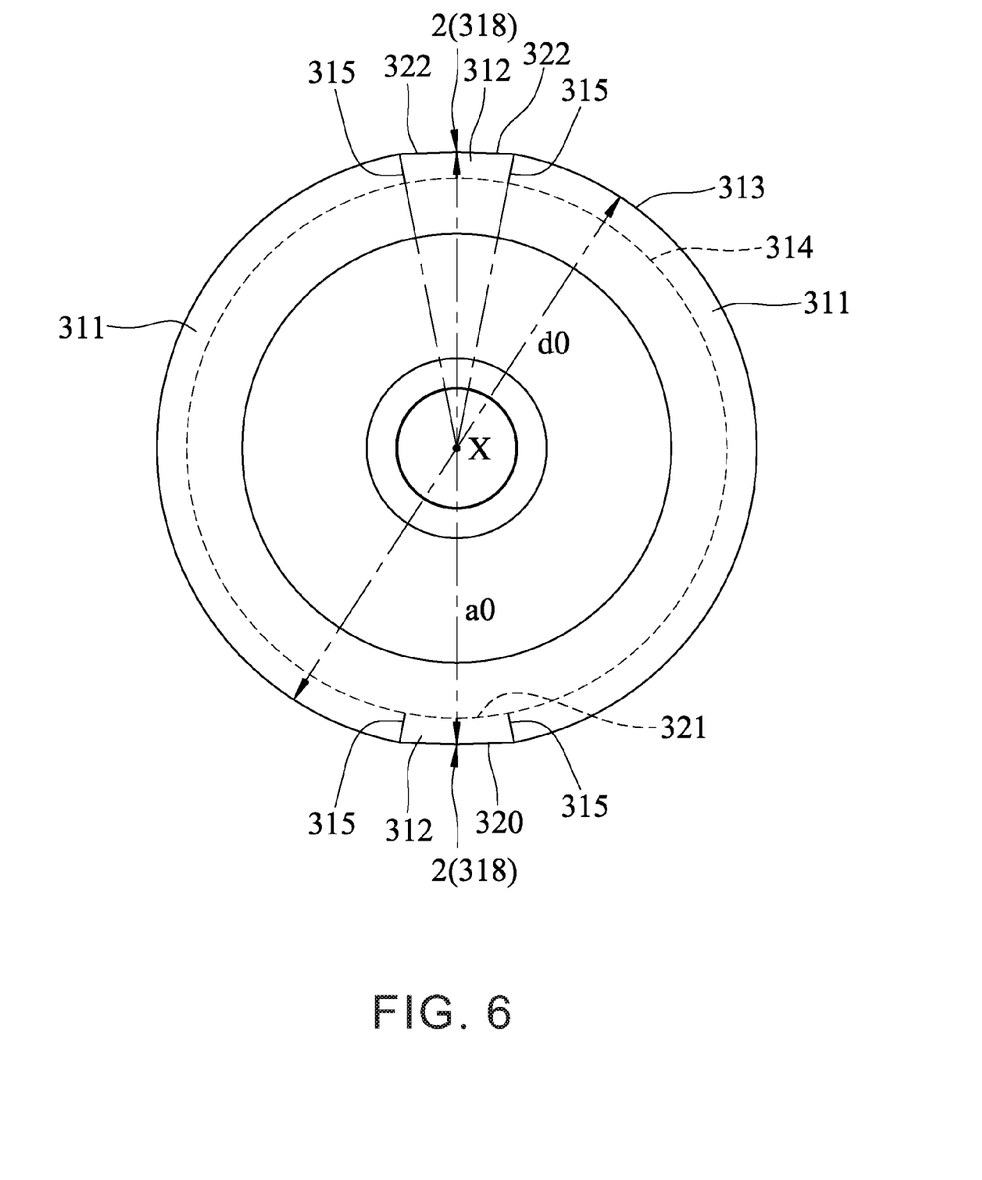
FIG. 6 is a top view of an embodiment depicted in FIG. 3.
Figure 7:
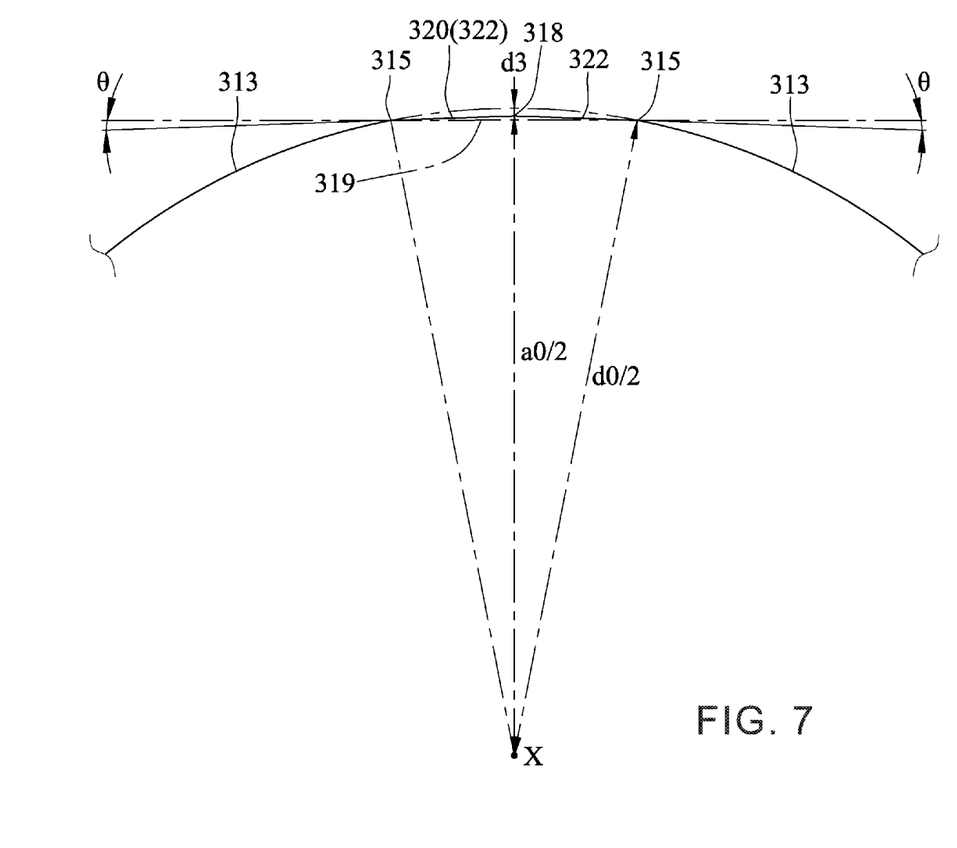
FIG. 7 is an enlarged sectional view of an embodiment depicted in FIG. 6.

Referring to FIG. 3 and FIG. 6, the present disclosure provides an embodiment of a barrel having shrinking threads. The barrel may comprise a cylinder wall 1, two parting lines 2, and an external thread 3.

The cylinder wall 11 may extend along an axis direction X.

The two parting line 2 may be symmetrically distributed along the axis direction X.

The external thread 3 may be intersected by the two parting lines 2, and may include a plurality of threads 31. The plurality of threads 31 may respectively extend outward from the outer surface of the cylinder wall 11 along the axis direction X, and the threads 31 may be connected continuously and spirally. Each of the threads 31 may include a pair of normal thread portion 311 and a pair of shrinking thread portion 312.

Referring to FIGS. 3-7, the pair of normal thread portion 311 may be located apart at two opposite sides of the parting line 2, and each of the normal thread portion 311 may include a normal thread crest 313, a normal thread root 314, and two end portions 315 mounted at two opposite sides of the normal thread portion 311 and extended along the axis direction X. Each normal thread crest 313 may have a normal outer diameter d0, each normal thread crest 313 may have a normal crest width d1 along the axis direction X, each normal thread root 314 may have a normal root width d2 along the axis direction X.

The pair of shrinking thread portions 312 may be located apart and intersected by the two parting lines 2 respectively, and each of the shrinking thread portions 312 may be located between the pair of the normal thread portions 311 and connected with the end portions 315 of the normal thread portions 311. Each shrinking thread portion 312 may include a middle location 318 intersected by the parting line 2, a cutting surface 319 between the end portions 315, a shrinking thread crest 320, and a shrinking thread root 312.

Each shrinking thread crest 320 may have a shrinking outer diameter a0 at the middle location 318, each shrinking thread crest 320 may have a shrinking crest width a1 at the middle location 318 along the axis direction X, and each shrinking thread root 321 may have a shrinking root width a2 at the middle location 318 along the axis direction X.

Figure 4:
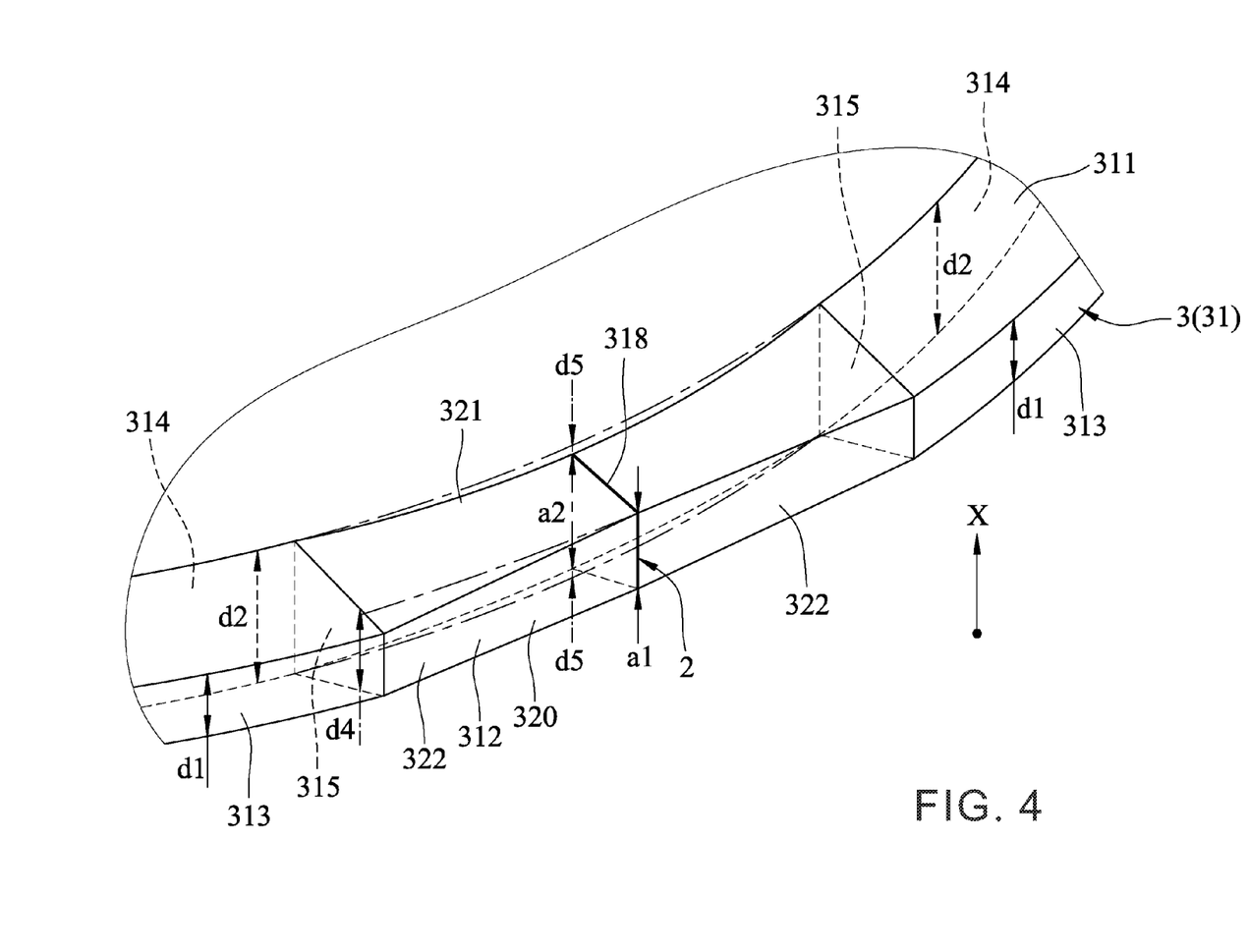
FIG. 4 is a part of an enlarged view of a shrinking thread portion according to the present disclosure.
Figure 5:
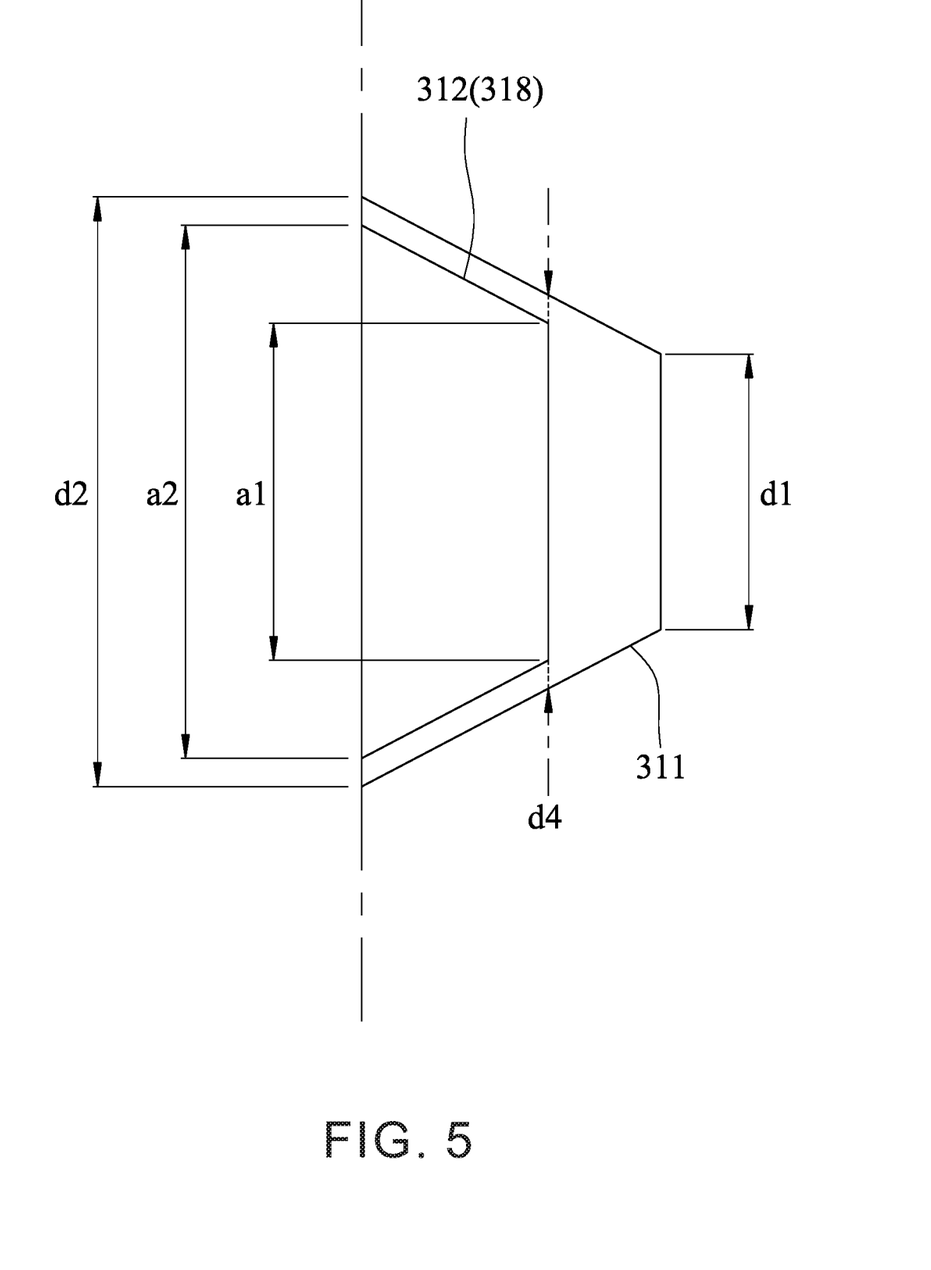
FIG. 5 is a part of an enlarged view illustrating a size difference between a normal thread portion and a shrinking thread portion.

The outer diameter of each shrinking thread crest 320 may be gradually decreased from corresponding end portions 315 to the middle location 318, and the minimal outer diameter a0 of the shrinking thread crest 320 at the middle location 318 may be smaller than the normal outer diameter d0 of the normal thread crest 313. The outer diameter of the shrinking thread crest 320 may be retracted between about 0.06 mm and about 0.16 mm relative to the normal outer diameter d0, the outer diameter of the shrinking thread crest 320 may be retracted a distance d3 relative to the normal outer diameter d0, wherein $d3=d0/2-a0/2$. The width of each shrinking thread crest 320 may be gradually increasing from corresponding end portions 315 to the middle location 318, and the width d1 of the shrinking thread crest 320 at the middle location 318 may be larger than the normal crest width d1 of the normal thread crest 313, and the width of each of the shrinking thread crests 320 at the middle location 318 may be smaller than the width of the normal thread portion 311 at a location where the outer diameter of the normal thread portion 311 is the same as the minimal outer diameter of the shrinking thread crest 320. As shown in FIG. 4, the end portion 315 may have a width d4 at a location where an arc having the outer diameter d0 intersects with the end portion 315, and the width d4 of the end portion 315 may be larger than the shrinking crest width a1 of the shrinking thread crest 320.

Each shrinking thread crest 320 may include two draft surfaces 322 extending from the middle location 318 to the end portions 315 of the normal thread crests 313. Each of the draft surfaces 322 may be relative to the cutting surface 319 with a draft angle θ. In this embodiment, the outer diameter of each shrinking thread crest 320 may be retracted about 0.12 mm relative to the normal outer diameter d0 of the normal thread crest 313 at the middle location 318, and d3=0.06 mm. In this embodiment, the draft angle θ between the draft surface 322 and the cutting surface 319 may be about 2 degrees.

The width of each shrinking thread root 321 may gradually decrease from the corresponding end portions 315 to the middle location 318 along the axis direction X, and the width a2 of the shrinking thread root 321 at the middle location 318 may be smaller than the width d2 of the normal thread root 314. The width of the shrinking thread root 321 may be retracted a distance d5 relative to the normal root width d2 along the axis direction X, wherein the distance d5 is between about 0.02 mm and about 0.06 mm. In some embodiments, the width of each shrinking thread root 321 at the middle location 318 may be retracted 0.015 mm relative to the normal root width d2 along the axis direction X.

Therefore, the outer diameter of each shrinking thread crest 320 and the width of each shrinking thread root 321 along the axis direction X are retracted relative to the normal thread portion 311 at the middle location 318. When the barrel of the present disclosure is engaged with a corresponding base, the burrs located at the parting lines 2 (at the middle location 318) can't fall from the parting lines 2 because the burrs do not rub against internal threads of the base, and then the dust pollution can be improved.

With the width of each shrinking thread crest 320 may gradually increase from the corresponding end portions 315 to the middle location 318 along the axis direction X and the width of each shrinking thread root 321 may gradually decrease from the corresponding end portion 315 to the middle location 318 along the axis direction X, the outer contour of the external thread 3 can be continuous and there may be no difference space at the outer counter of the external thread 3 so that pollution created by the burrs and dust accumulated in the difference space can be avoided.

At the middle location 318, the width of each shrinking thread crest 320 along the axis direction X may be larger than the normal crest width d1, so that the difference in surface profile between the shrinking thread portion 312 and the normal thread portion 311 may be decreased greatly, it means the surface profiles of the shrinking thread portion 312 and the normal thread portion 311 may be approximately connected smoothly, and the draft surface 312 may be relative to the cutting surface 319 with a draft angle θ. The present disclosure can lower the attrition rate during the parting mold process of the barrel and further increase the yield of manufacturing the barrel.

Moreover, when the barrel of the present disclosure is engaged with a corresponding base, a part of the shrinking thread portions 312 can assist in contacting with the internal thread of the base (not shown) because the difference in surface profile between the barrel and the base is not obvious. With the shrinking thread portion 312, the engagement between the barrel and the base can be sufficiently enhanced, the torsion between the barrel and the base can be stable and continuous, and an optical axis tilt offset caused by assembly of the barrel can be sufficiently decreased.

In summary, with the width of each shrinking thread crest 320 along the axis direction X being larger than the normal crest width d1 and the outer diameter of each shrinking thread crest 320 and the width of each shrinking thread root 321 along the axis direction X being retracted relative to the normal thread portion 311, the outer contour of the external thread 3 may be continuous and there may be no difference space at the outer counter of the external thread. The difference between the outer counters of shrinking thread portion and normal thread portion can be decreased so that assembly pollution can be efficiently improved and the yield of manufacturing the barrel can be promoted.

While various embodiments in accordance with the disclosed principles have been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A barrel having shrinking threads, and the barrel comprising:
    a cylinder wall extending along a axis direction;
    two parting lines symmetrically distributed along the axis direction; and
    an external thread intersected by the two parting lines respectively and including a plurality of threads, the plurality of threads extending outward from an outer surface of the cylinder wall, the plurality of threads connected spirally and each of the threads including:
        a pair of normal thread portion located apart at two sides of the parting lines respectively, and each of the normal thread portions including a normal thread crest, a normal thread root, and two end portions mounted at two opposite sides of the normal thread portion and extended along the axis direction, each of the normal thread crests having a normal crest outer diameter $d_0$ along a radial direction, each of the normal thread crests having a normal crest width $d_1$ along the axis direction, each of the normal thread roots having a normal root width $d_2$; and
        a pair of shrinking thread portion mounted apart and intersected by the parting lines respectively, and each of the shrinking thread portions located between the pair of normal thread portions and connected with the end portions of the normal thread portions, each of the shrinking thread portions including a middle location intersected by one of the parting lines, a shrinking thread crest, and a shrinking thread root, the outer diameter of each of the shrinking thread crests having a shrinking crest outer diameter $a_0$ at the middle location along the radial direction, each of the shrinking thread crests having a shrinking crest width $a_1$ along the axis direction at the middle location, each of the shrinking thread roots having a shrinking root width $a_2$ long the axis direction at the middle location, the outer diameter of each of the shrinking thread roots decreasing from the end portions to the middle location along the radial direction, the outer diameter of each of the shrinking thread roots reaching a minimum at the middle location and $a_0 < d_0$, the width of each of the shrinking thread crests increasing from the end portions to the middle location along the axis direction, the width of each of the shrinking thread crests being larger than the normal crest width and $a_1 > d_1$, the width of each of the shrinking thread roots decreasing from the end portions to the middle location along the axis direction, the width of each of the shrinking thread roots being smaller than the normal root width and $a_2 < d_2$.

2. The barrel according to claim 1, wherein the width of each of the shrinking thread crests at the middle location is smaller than the width of the normal thread portion at a location where the outer diameter of the normal thread portion is the same as the minimal outer diameter of the shrinking thread crest.

3. The barrel according to claim 1, wherein the middle location of each of the shrinking thread location is located at the center of the shrinking thread portion.

4. The barrel according to claim 3, wherein each of the shrinking thread portions further includes a cutting surface between the end portions, each of the shrinking thread crests includes two draft surfaces respectively extending from the middle location to the end portions, each of the draft surfaces is relative to the cutting surface with two degrees.

5. The barrel according to claim 1, wherein the outer diameter of each of the shrinking thread crests at the middle location is retracted a distance relative to the outer diameter of the normal thread crest along the radial direction, the retracted distance is between 0.06 mm and 0.16 mm.

6. The barrel according to claim 1, wherein each of the shrinking thread crests at the middle location is retracted a distance relative to the normal crest outer diameter $d_0$ along the radial direction, and the retracted distance is 0.12 mm.

7. The barrel according to claim 1, wherein the width of each of the shrinking thread roots at the middle location is retracted a distance relative to the normal root width $d_2$ along the axis direction, and the retracted distance is between 0.02 mm and 0.06 mm.

8. The barrel according to claim 1, wherein the width of each of the shrinking thread roots at the middle location is retracted a distance relative to the normal root width $d_2$ along the axis direction, and the retracted distance is 0.03 mm.

* * * * *